United States Patent [19]

Galliker

[11] 4,043,047
[45] Aug. 23, 1977

[54] PROCESS AND APPARATUS FOR THE TREATMENT OF WATER-CONTAINING SUBSTANCES AND APPLICATION OF THIS METHOD FOR THE PREPARATION OF PASTEURIZED DRIED SLUDGE

[75] Inventor: Joseph Galliker, Wettingen, Switzerland

[73] Assignee: Patelhold Patentverwertungs- & Elektro-Holding AG., Glarus, Switzerland

[21] Appl. No.: 656,008

[22] Filed: Feb. 6, 1976

[30] Foreign Application Priority Data

Mar. 3, 1975 Switzerland .......................... 3417/75

[51] Int. Cl.² ............................................. F26B 3/34
[52] U.S. Cl. ........................................ 34/1; 204/149; 204/155

[58] Field of Search ....................... 34/1; 204/149, 155

[56] References Cited

U.S. PATENT DOCUMENTS

| 894,070 | 7/1908 | Schwerin | 34/1 X |
| 3,798,784 | 3/1974 | Kovats et al. | 34/1 |
| 3,846,300 | 11/1974 | Inoue | 204/149 |
| 3,920,530 | 11/1975 | Xylander | 204/149 |

Primary Examiner—John J. Camby
Attorney, Agent, or Firm—Pierce, Scheffler & Parker

[57] ABSTRACT

A watery sludge is at least partially dehydrated by a heat treatment which includes an electrolytic heat treatment, and thereupon is subjected to a dielectric high-frequency treatment, with the result that the sludge is converted to a friable pasteurized dried "mud."

14 Claims, 3 Drawing Figures

PROCESS AND APPARATUS FOR THE TREATMENT OF WATER-CONTAINING SUBSTANCES AND APPLICATION OF THIS METHOD FOR THE PREPARATION OF PASTEURIZED DRIED SLUDGE

In the course of operations by the food, feed, chemical and building-material industries there are substances dried, pasteurized and distilled by means of heat. Thermal treatment is utilized for similar tasks in the field of environmental protection. Dielectrical high-frequency heating is one known heat-treatment method. Its use permits the rapid and homogeneous heating of many materials at high power ratios. However, if the materials to be so treated have a high moisture content, the known high-frequency treatments will fail, unless these materials are dehumidified prior to treatment. The use of this dehumidification is, however, limited for economic as well as technological reasons. The water content of the materials especially can be reduced by mechanical means only to specific threshold values.

It is an object of the invention to provide a process and an apparatus for the treatment of water-containing substances, superior in economic as well as technological respect to the treatment methods and devices known heretofore. The process proposed by the invention as a solution of this problem is characterized by the combination of any electrolytic heat-treatment with a subsequent dielectrical high-frequency treatment. For the purpose of carrying out this process the invention provides an apparatus which consists of one stage for the electrolytic heat-treatment of the water-containing substances, followed by a stage for the dielectrical high-frequency heating of the pre-dried substances upon leaving the first-mentioned stage.

One primary field of application of the process proposed by the invention is, in accordance with the invention, the preparation of pasteurized dried sludge. The invention will be explained below on the basis of practical examples, but a few basic analyses are first in order.

A substance, be it in solid, liquid or gaseous physical state, is normally heated in such manner that energy is transferred by direct contact, heat condition, radiation, friction and similar methods. It also is possible to transfer heat transfer by means of supersonics. Solid substances can be heated also with the aid of an electric or magnetic pulsating field, and in this latter case the conversion of the electric or magnetic energy takes place within the substance proper. This has the advantage over standard method of heat transfer that the heating can be accomplished rapidly and homogeneously at a high power ratio and at an excellent thermal efficiency.

In case of metallic materials this heating is accomplished by a medium- or high-frequency magnetic pulsating field; also, by conductive or ohmic current flow. Non-conducting materials, to be considered dielectric substances with a dielectric loss angle, can be heated by means of a field pulsating at high frequency. Microwave heating, employed for example to thaw deep-frozen products and to prepare meals, is included in the latter group.

The effect attained by dielectric heating in case of non-conducting solid materials is also attainable in a low-frequency, electrically pulsating field if electrically conducting fluids are involved, utilizing an electrolytic process (see Swiss Pat. No. 559,152).

Various methods used for heating or dehydrating materials by means of dielectric heating often encounter the difficulty that the material to be treated has an excessively great dielectric loss angle, especially in case of materials with an excessively high moisture content. These substances contain, in addition to molecules or groups of molecules responding to dielectric polarization, also free ions which will act a ohmic, or rather electrolytic, conductors. In this case a purely dielectrical heating will not be possible, or at least not feasible for reasons of economy.

It is at this point where the invention becomes uniquely useful and applicable because it separates the process so to speak into two stages, each stage taking into consideration the existing physical and technological conditions with optimum effect. The substance to be treated is cleared electrolytically of any free ions. The substance is then subjected to the subsequent dielectric high-frequency treatment. This treatment process is particularly suitable for wet (watery) solids, in other words materials between the liquid and the solid state (mush) because in this mushy state there is always present one locally bound "fixed ion component" and one moving "ion component".

In conductive electrodes are applied to such material, there will flow initially a substantially constant low-frequency current at a given voltage. As the material becomes heated fluid evaporates, thus reducing the number of ions conducting the current flow. When all free ions are gone, the low-frequency power input will cease, and any further supply of heat can take place only by way of the dielectric high-frequency heating.

The invention will now be explained below by the use of practical examples which are illustrated in the appended drawing in which FIG. 1 shows in diagrammatic form and in side view a treatment plant for water-containing substances;

Figure 1:
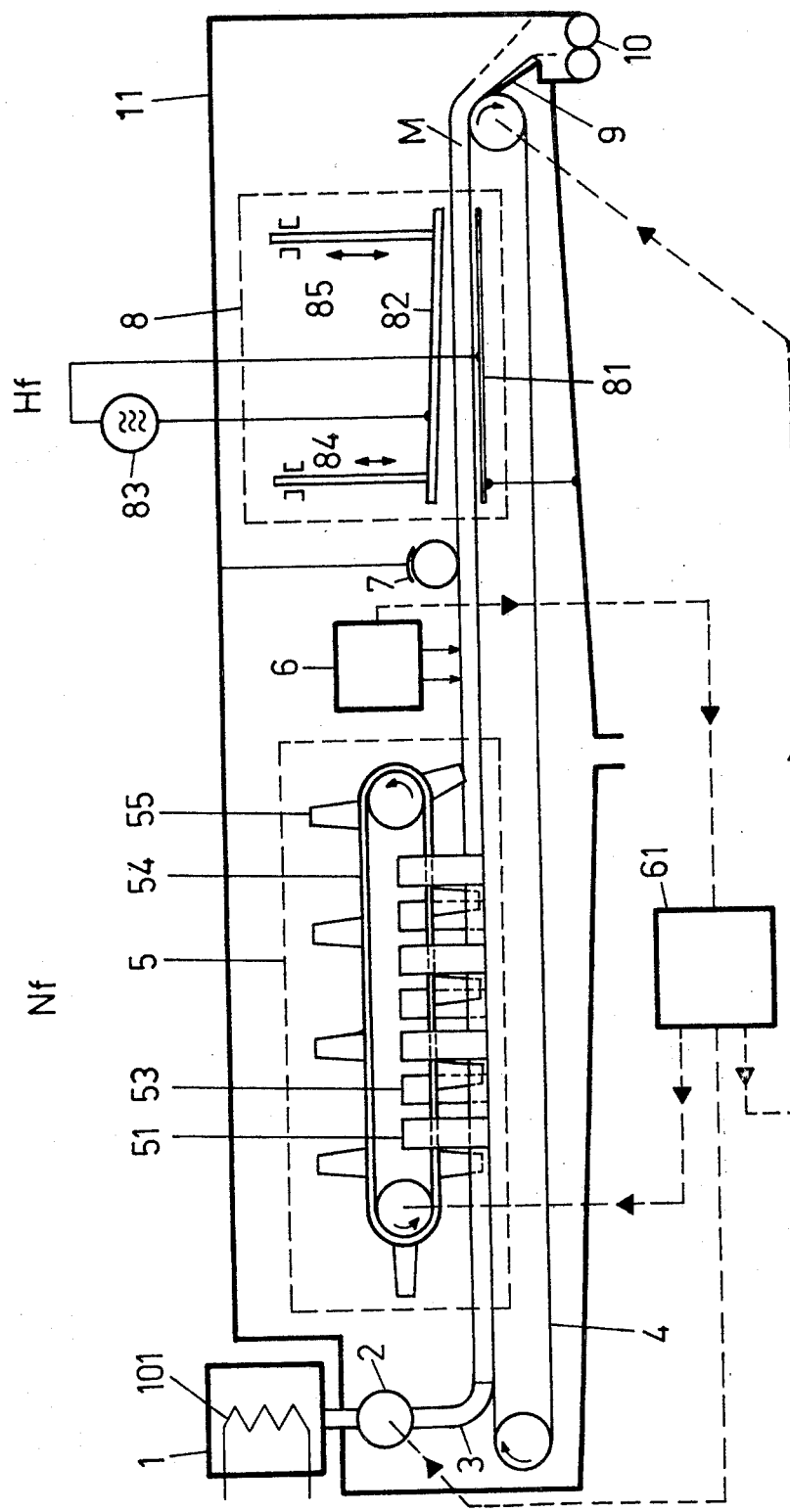

According to FIG. 1, the material M to be treated is fed into an initial tank 1 and is heated there by exhaust heat. The pre-heated material is forced through a profile orifice 3 by means of a piston pump 2, giving the material a rectangular shape. From there the material passes to a transporting device, for example a conveyor belt 4, which moves this material through an electrolytic heat-treatment unit 5. This unit comprises a multitude of vertically arranged metal sheets 51, 53 which are connected in pairs to an alternating current source, preferably to the a.c. mains by way of a regulating transformer 56 (see FIG. 2). The surfaces of the metal sheets 51, 53 and their geometric layout are designed in such manner that the adhesive friction between the sheets and the material to be treated is weaker than the adhesive friction between the conveyor belt 4 and the material. The metal sheets 51, 53 cut the material into separate strips. The electric field that is in force between the metal sheets causes an optimum and homogeneous heating of the material. The furrows created in the material facilitate the exit of vapors. By designing the schematically shown drive of the conveyor belt oscillating or pulsating, one will improve even further the electric current transfer between the metal sheets 51, 53 and the material. The metal sheets 51, 53 can be connected in various circuit combinations to a single- or multi-phase network by way of an adjustable transformer, depending on the output required. The voltage across the metal sheets 51, 53 must be selected in such manner that the optimum treatment current for the low-frequency heating can always flow, depending on the material to be treated and its quantity of flow.

The electrolytic heat-treatment unit 5 further comprises a device for the continuous cleaning of the metal sheets. The device consists of sheet cleaners 55 which are mounted on a transporting chain 54; they consist of insulative material and are moved in synchronization with the material to be treated.

The electrolytic heating unit 5 is followed by a mesuring device 6 to determine the resistivity or conductivity of the material being treated. The output of this measuring device influences by way of control unit 61 the drive of the conveyor belt 4, which belt in turn is coupled to the drive of the sheet cleaner 55. The control unit regulates the quantity of flow in functional relation to the conductivity of the material to be treated. It will be expedient to include the speed of pump 2 in the regulating system. The above-described work connections are illustrated in FIG. 1 by broken lines.

As viewed in the direction of material flow, the conductivity-measuring 6 is followed by an equalizing roller 7 to homogenize the pre-dehydrated material prior to its entry into the second heat-treatment stage. This treatment is accomplished within an Hf-condenser 8, which consists of an earth electrode 81 fixedly arranged below conveyor belt 4, and an electrode 82, located above the material and adjustable in height. In order to make allowance for changes in character of the material when passing through the condenser 8 —during the passage tan $\theta 0$ as well as $\epsilon$ of the material will change— the clearance between the material on belt 4 and electrode 82 is made greater at the entry than at the exit. The electrodes 81, 82 are energized by an Hf-generator 83. Adjusting device 84, 85 sets the clearance between the material and the electrode 82.

At the end of the conveyor belt system there is located a scraper 9, separating the treated, dry material from belt 4, with the material dropping into a dusting material grinder 10. It is reduced there to the desired grain size, and can be moved from there to further processing such as packing and the like. The conveyor belt is surrounded throughout its entire length by a covering hood 11, the hood also spanning the electrolytic treatment unit and the high-frequency condenser 8. This hood serves firstly for the channeled removal of vapor and any condensation product, and secondly as shield from the high frequency and as protection against contact. Hood 11 is preferably heat-insulated exteriorally.

In order to improve the thermal efficiency of the entire process, the water vapor produced during the heating in the two stages is utilized for the pre-heating of the material to be treated in initial tank 1. The walls of this tank are designed for this purpose in the form of dual walls or are provided with suitably constructed heat exchangers 101. The pre-heating of the material will also cause a lowering of its viscosity, resulting in a more efficient heat transfer during the electrolytic heating.

Figure 2:
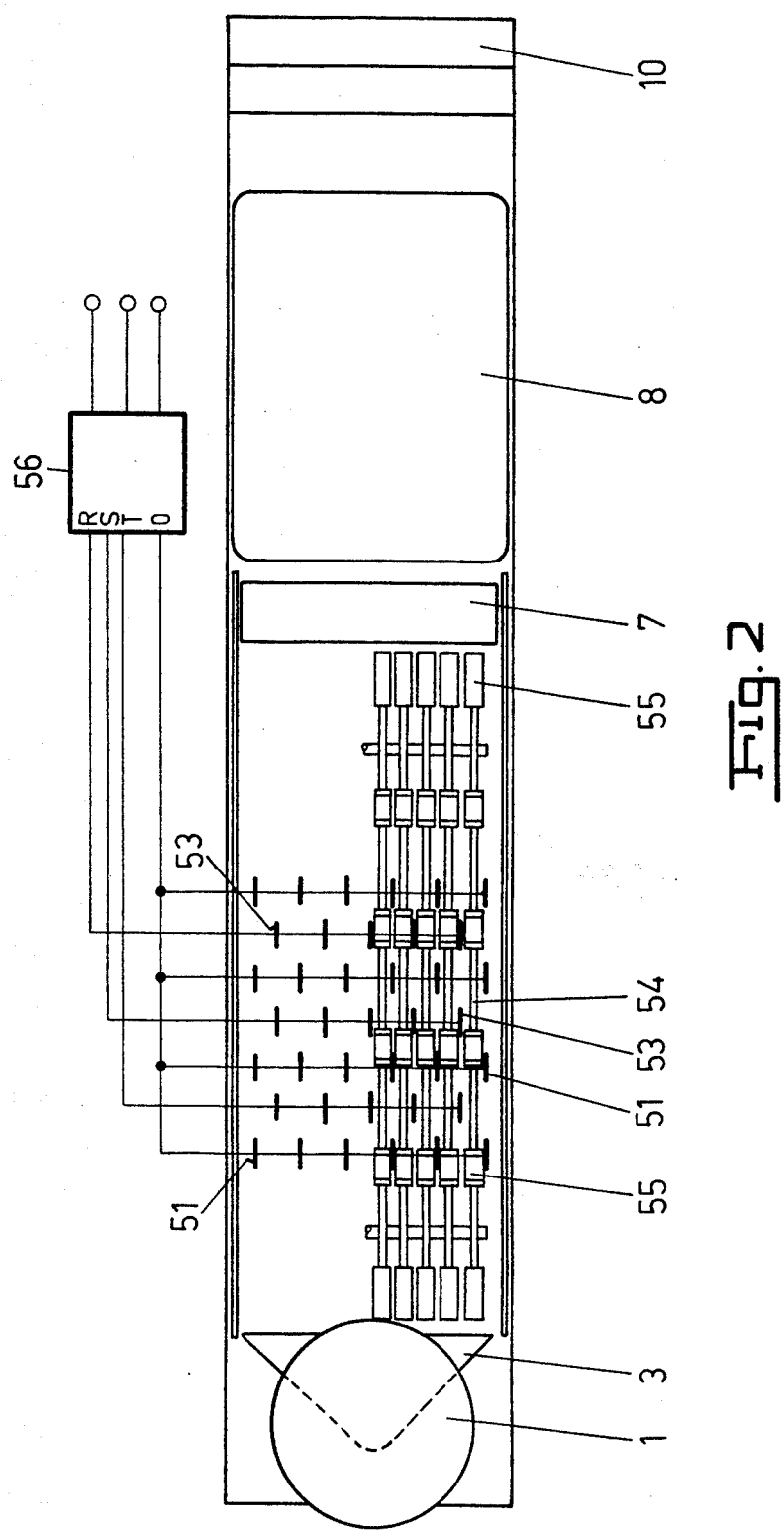
FIG. 2 shows the same plant in top view.

FIG. 2, which illustrates in top view the arrangement depicted in side view by FIG. 1 and which denotes identical of the metal sheets 51, 53 and their electrical connections.

A preferred application of the process proposed by the invention is the preparation and pasteurization of dried sludge ("Schlamm") which will be explained below. The reaction of interested parties to the method described by the previously mentioned Swiss Pat. No. 559,152 concerning the pasteurization of activated sludge ("Faulschlamm") indicates that there exists a great need for systems which comprise devices not only for the pasteurization of the sludge but also for its processing into a product which is ecology-oriented and which can be used for many purposes.

Pasteurized activated sludge with a water content in excess of 90% has several disadvantages; the daily yield and the hauling away of great masses of liquid sludge, their transport as well as storage being limited for economic reasons; the danger of subsoil water contamination in chemical as well as biological respect; pollution of the sludge with undersirable chemical substances in certain industrial areas which preclude a recycling for agricultural use. Sludge of this type is therefore burned, thereby creating another environmental burden (consumption of energy and oxygen, air pollution, etc.).

There are various methods available for the further treatment of the activated sludge but these methods are either not economical or will not lead to any significant improvements. For example, the sludge arriving from the tower is being dehydrated by use of hydro-extractors and/or filtering presses. However, this treatment requires the conditioning of the sludge by use of flocculants, and the water content can not be reduced below 70% by this process. The end-product obtained in this manner is a "puncture-proof" wet paste, not yet pasteurized and for technical reasons not suitable for delivery to the fields. The end product obtained in this form is usually burned with other waste materials and represents thus an additional environmental burden.

Figure 3:
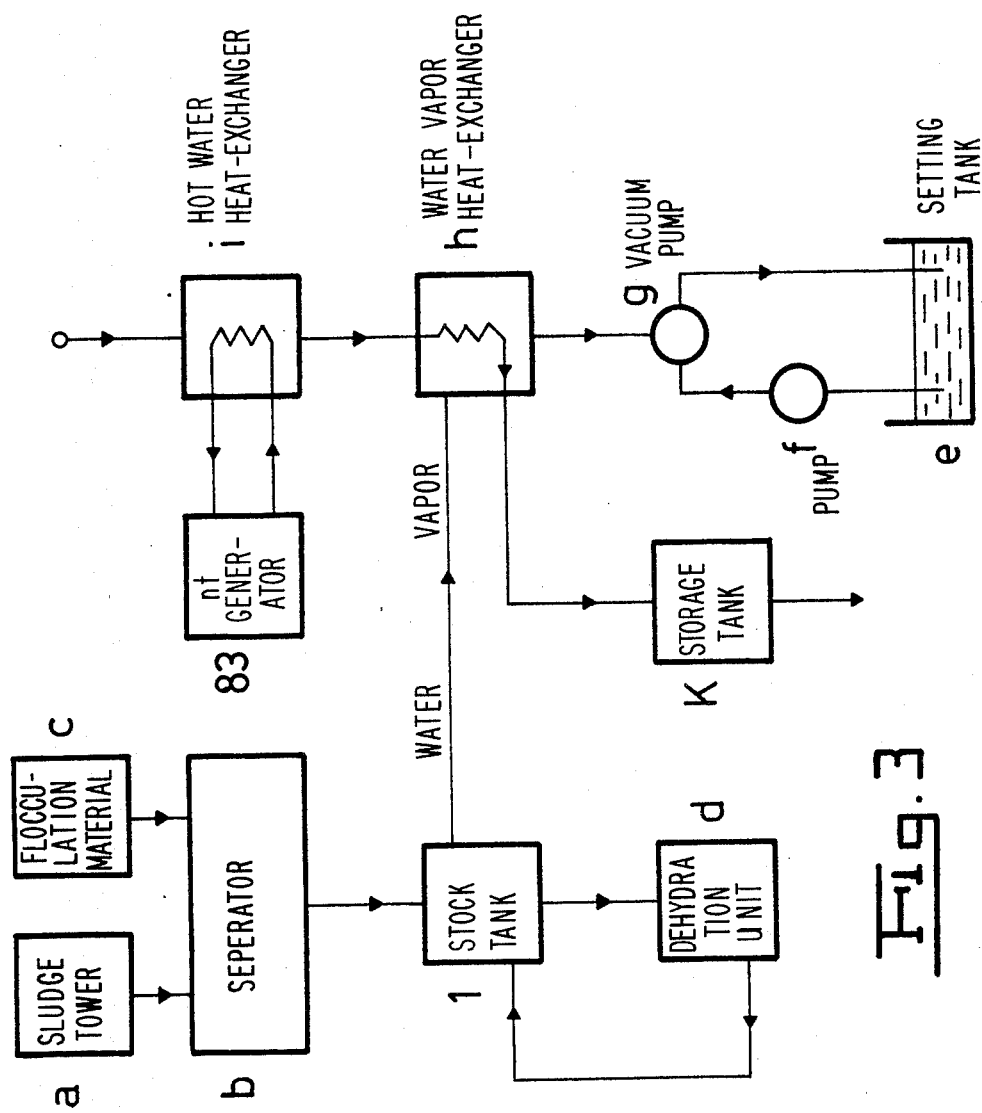
FIG. 3 illustrates by use of functional blocks one example for the application of the invention, namely the treatment of "Faulschlamm" (sapropel or activated sludge) in a filter plant.

The situation is entirely different if the process of the invention is employed for the treatment of the activated sludge. It follows (for energy reasons) the mechanical dehydration, that is, activated sludge with a water content of approximately 70%. According to FIG. 3, which depicts an example of an activated sludge treatment plant in diagram form, the sludge, leaving the tower $a$, is mechanically dehydrated in a separator $b$, and a flocculation medium is delivered from the conditioning unit $c$ and added to the partially dehydrated sludge. The partially dehydrated sludge moves from the separator $b$ to the initial tank 1 of the combined nf-hf dehydration unit $d$ (according to FIGS. 1 or 2 respectively). From a settling tank $e$ there is activated with the aid of a pump $f$ a water jet vacuum pump $g$ which draws the vapor, generated during the nf-hf dehydration, through the tank 1 —to preheat the partially dehydrated sludge arriving from the separator— and through a vapor-water heat exchanger $h$, following the tank 1. The condensation product, obtained by heat exchange with the water in the secondary cycle of the heat exchanger $h$, is returned to settling tank $e$.

Within this secondary cycle there flows the water to be heated, first over a second heat exchanger $i$ which extracts waste heat from the internal cooling-water circulation of the hf-generator 83, then over the heat exchanger $h$, and from there to a storage tank $k$.

The sludge treatment plant intentionally is illustrated in a simplified manner for reasons of clarity. Omitted from the showing are the control and regulating devices, and their various components which are necessary for operations have been described only as to their effects. However, any person skilled in the art will be able to use this block system as shown in order to gain the information needed for the practical application of the process of the invention. This proposed processing of sludge, in combination with the above-described mechanical dehydration, offers the following advantages:

a. it becomes possible to reduce the volume of the accrued sludge to approximately 10%, and its weight to approximately 6%;

b. the product can be stored in bags or containers at any location desired without the need for special precautionary measures, especially in regard to environmental problems, in other words, annoying odors and pollution of subsoil water are eliminated;

c. the thermal efficiency so far as conversion of electric energy is concerned surpasses all systems of record since heat is generated within the material proper so that heat transfer means are not needed;

d. approximately 80% of the applied (electric) energy can be regained in the form of vapor and consequently be used to produce hot water, and will also be available for other issues;

e. the proposed dehydration process accomplishes not only the required pasteurization but a sterilization also. The substances which are of value organically for fertilizing purposes will not be destroyed as in case of other treatment processes, such as the hot air process described for example in Swiss Pat. No. 559,151, the reason being that in case of the process proposed by the application the temperatures inside the material will hardly exceed 100° C;

f. the final product is a dry "mud" in dust form which can be further improved to become a valuable fertilizer by the addition of suitably compounded substances;

g. in view of its low volume and weight, the dry mud can be utilized in many different manners and ways, especially in regions far removed from densely populated areas (mountain pastures and the like), and dry mud obtained from chemically loaded drainage areas can be deposited at other, far removed regions without any danger;

h. since the germ-killing effect of the combined nf-hf dehydration process is substantially greater than in the case of the standard pasteurization process, it also destroys eggs of dangerous parasites (tapeworms, bellyworms), thus interrupting the biological cycle and protecting the host from renewed attacks by such parasites and effects harmful to health;

i. in contrast to known radiation processes (using electron or gamma rays) there is no need for any additional dehydration process in order to obtain dusting material; the process proposed by the application takes it course in closed-off area with no detrimental effects on the environment.

A pilot plant for disposal of city sludge, constructed in accordance with the characteristics of the invention, had the following test results:

The raw material was a sapropal or activated sludge ("Faulshlamm") with a 95% water content. This material was dehydrated mechanically, resulting in a predried sludge with a water content reduced by approximately 70%. The reduction in weight amounted to approximately 83%. The additional lowering of the water content down to 30% required the use of approximately 75 kilowatt hours for 1,000 kg of raw material, with 42 kWh used for the electrolytic dehydration —the water content was reduced to 50% during this operation—, and 33 kWh for the dielectric dehydration —a lowering of the water content from 50% to 30%. The data given for the electric power output include the thermal efficiencies attained (0.95 for the electrolytic, and 0.6 for the dielectrical dehydration). Approximately 80% of the energy applied could be recovered in the form of hot water.

I claim:

1. Process for the treatment of a water-containing substance which comprises
   conveying the substance to a first treatment station;
   extracting a portion of the water from the substance within said first station by electrolytically heating the substance in such manner that the substance is guided through elongated electrodes which are energized by alternating current for heating purposes;
   conveying the so pre-desiccated material to a second treatment station;
   dielectrically heating the substance through all but a few percent of the original water content of the water-containing substance the dielectric heating being effected by passing the substances between plates of a condenser energized by a high-frequency source.

2. Process defined in claim 1, wherein the water-containing substance is preheated, prior to its electrolytic treatment, by heat exchange with the water vapor produced during the electrolytic and dielectric treatments.

3. Process defined in claim 1, wherein (a) the quantity of flow through the electrode system and (b) the supply of energy for the electrolytic treatment stage (5) are regulated in functional relation to the conductivity of the pre-dehydrated substance leaving this stage.

4. Process defined in claim 1, wherein the water-containing substance is conducted through said electrode system in the form of an oscillating or pulsating motion.

5. The process defined in claim 1, wherein pasteurized dry mud is produced from activated sludge.

6. The process defined in claim 5, wherein water-containing activated sludge is pre-dehydrated prior to the electrolytic heat treatment by mechanical means, possibly by admixture of a conditioning agent.

7. The process defined in claim 5, wherein the mechanically pre-dehydrated substance is conducted into a first stage (5) for electrolytic heat-treatment, and subsequently into a second stage (8) for dielectric high-frequency treatment.

8. The process defined in claim 5, wherein the dehydrated substance is brought into a state where it can be spread ("streuen") or stored.

9. Apparatus for dehydrating and pasteurizing a water-containing sludge, which comprises
   a first stage (5) for electrically heat-treating a water-containing sludge, said first stage comprising an electrode system consisting essentially of vertically arranged pairs of metal sheets (51, 53) and means for energizing said sheets from a source of technical alternating current;
   transport means, including a conveyor belt, so arranged as to receive pre-dehydrated material leaving said first stage;
   speed-controlling means for moving said conveyor belt in functional relation to the conductivity of such pre-dehydrated material;
   a second stage (8) for dielectric high-frequency heating of pre-dehydrated material leaving said first stage, said second stage comprising at least two electrodes (81, 82) and means for energizing said electrodes with energy from a high-frequency source thereof, wherein one electrode is arranged above and the other electrode is arranged below said conveyor belt.

10. Apparatus defined in claim 9, wherein for the cleaning of the metal sheets (51, 53) there are arranged metal sheet cleaners (55) which move in synchronization with the substance.

11. Apparatus defined in claim 9, wherein for transporting the substance there is provided a conveyor belt (4), the speed of which is controlled in functional relation to the conductivity of the pre-dehydrated substance leaving the first stage (5).

12. Apparatus defined in claim 9, wherein means (3, 7) are provided for the shaping of the substances to be treated in the two stages (5, 8).

13. Apparatus defined in claim 9, wherein both stages 5 and 8 are surrounded jointly by one covering hood (11).

14. Apparatus defined in claim 9, wherein a preheating unit (1) for the pre-heating of the substance to be treated, charged by the waste heat from both states (5, 8), is placed serially in front of the first stage (5).

* * * * *